US011880703B2

(12) United States Patent
Scrivano (10) Patent No.: US 11,880,703 B2
(45) Date of Patent: Jan. 23, 2024

(54) OPTIMIZATION OF MULTI-LAYERED IMAGES

(71) Applicant: Red Hat, Inc., Raleigh, NC (US)

(72) Inventor: Giuseppe Scrivano, Milan (IT)

(73) Assignee: RED HAT, INC., Raleigh, NC (US)

( * ) Notice: Subject to any disclaimer, the term of this patent is extended or adjusted under 35 U.S.C. 154(b) by 55 days.

(21) Appl. No.: 16/290,479

(22) Filed: Mar. 1, 2019

(65) Prior Publication Data

US 2020/0278877 A1 Sep. 3, 2020

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC .......... G06F 16/58; G06F 2209/5011; G06F 9/30043; G06F 9/45504; G06F 9/50; G06F 9/544
See application file for complete search history.

(56) References Cited

U.S. PATENT DOCUMENTS

| 9,928,210 | B1* | 3/2018 | Zhang | G06F 15/8084 |
|---|---|---|---|---|
| 10,002,247 | B2 | 6/2018 | Suarez et al. | |
| 2018/0088926 | A1* | 3/2018 | Abrams | H04L 67/34 |
| 2018/0267990 | A1* | 9/2018 | Cherukuri | G06F 16/178 |
| 2018/0275987 | A1 | 9/2018 | Vandeputte | |
| 2018/0307537 | A1* | 10/2018 | Chen | G06F 9/4881 |
| 2018/0336021 | A1 | 11/2018 | Scrivano et al. | |
| 2019/0243907 | A1* | 8/2019 | Baughman | G06F 16/13 |
| 2019/0347121 | A1* | 11/2019 | Luo | G06F 3/0644 |
| 2019/0354382 | A1* | 11/2019 | Ross | G06F 9/45558 |
| 2019/0354389 | A1* | 11/2019 | Du | G06F 8/63 |
| 2020/0241875 | A1* | 7/2020 | Chen | G06F 9/544 |

OTHER PUBLICATIONS

Santoro, Corrado, et al. "Wale: a Dockerfile-based approach to deduplicate shared libraries in Docker containers." Aug. 12, 2018. IEEE 16th Intl Conf on Dependable, Autonomic and Secure Computing. pp 785-791. (Year: 2018).*

Sochat, Vanessa. "Containershare: Open Source Registry to build, test, deploy with CircleCI." Aug. 7, 2018. Journal of Open Source Software 3.28 (2018): 878. (Year: 2018).*

(Continued)

*Primary Examiner* — Wynuel S Aquino
(74) *Attorney, Agent, or Firm* — HAYNES AND BOONE, LLP (57) ABSTRACT

A method includes, with a computing system, storing a first container image. The first container image may be defined by a first set of layers. The method further includes, with the computing system, storing a second container image, the second container image defined by a second set of layers. The second set of layers has at least one file in common with a file in the first set of layers. The method further includes, with the computing system, performing an analysis of the first set of layers and the second set of layers. The method further includes, with the computing system, using the analysis to create a new set of layers such that both the first container image and the second container image can be derived from the new set of layers.

20 Claims, 5 Drawing Sheets

(56) References Cited

OTHER PUBLICATIONS https://doc.docker.com/v17.09/engine/userguide/storagedriver/imagesandcontainers/#images-and-layers About Images, Containers, and Storage Drivers; 2017.
https://tuhrig.de/layering-of-docker-images/ Layering of Docker images; May 9, 2014.
https://opensource.com/article/18/7/building-container-images Building Tiny Container Images, 2018.
https://www.twistlock.com/resources/docker-basics-whitepaper-chapter-2/ Docker Containers, 2012.

\* cited by examiner

OPTIMIZATION OF MULTI-LAYERED IMAGES

BACKGROUND

The present disclosure relates generally to virtual computing systems, and more particularly, use of physical Peripheral Component Interconnect (PCI) devices for virtual computing systems.

A container provides a platform to separate an application from the infrastructure running the application. The platform may provide a mechanism to run an application securely isolated in the container. A container is a self-contained execution environment and may share the kernel of the host operating system with other containers. The lightweight nature of containers, which run without the extra load of a hypervisor, may result in better use of hardware. Additionally, multiple containers may run on a machine.

SUMMARY

A method includes, with a computing system, storing a first container image. The first container image may be defined by a first set of layers. The method further includes, with the computing system, storing a second container image, the second container image defined by a second set of layers. The second set of layers has at least one file in common with a file in the first set of layers. The method further includes, with the computing system, performing an analysis of the first set of layers and the second set of layers. The method further includes, with the computing system, using the analysis to create a new set of layers such that both the first container image and the second container image can be derived from the new set of layers.

A method performed by a computing system includes storing a plurality of container images. Each container image may be derived from a unique set of layers. The method further includes analyzing the sets of layers for each of the plurality of container images to determine common files within the layers and creating a new set of layers from which each of the plurality of container images can be built.

A system includes a processor and a memory having machine readable instructions that when executed by the processor, cause the system to store a first container image. The first container image may be defined by a first set of layers. The system is further to store a second container image, the second container image defined by a second set of layers. The second set of layers has at least one layer in common with the first set of layers. The system is further to perform an analysis of the first set of layers and the second set of layers and use the analysis to create a new set of layers such that both the first container image and the second container image can be derived from the new set of layers.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

A container is an isolated processing space that can exist on top of a virtual machine or on top of actual hardware. The container may be viewed as a lightweight virtual machine that is used to create environments and may share the operating system with the host machine, preserving resources. In an example, a container may offer software that creates virtual environments mimicking a full virtual machine.

Before a container is up and running, it is stored as a file. This file includes all the data and metadata used to run the container. This file is referred to as an image, or a container image. This container image is used by a container engine to run a container. Specifically, the container engine unpacks the files and metadata from an image and starts the container on a processing system.

In some cases, an image container is not a single file. Rather, it is a collection of multiple files in a parent-child relationship. These files may be defined as multiple layers. A particular database that stores container images may include several images, each image defined by a set of layers. However, many of these separate layers for separate images have similar or identical files. For example, Image 1 may include a first layer with file A and a second layer with file B. Image 2 may include a first layer with file B and a second layer with file C. Thus, file B is stored twice within the database. This redundant storage of file B may unnecessarily waste storage and computing resources.

According to principles described herein, a database of container images can be optimized so that a set of layers can be used to define multiple, different containers. In continuance of the example above, a new set of layers may include a first layer with file A, a second layer with file B, and a third layer with file C. Then, to load Image 1, the container engine may use the first and second layers. To load Image 2, the container engine may use the second and third layers. In other words, the container engine uses only a subset of the optimized layers to create a particular image.

Figure 1:
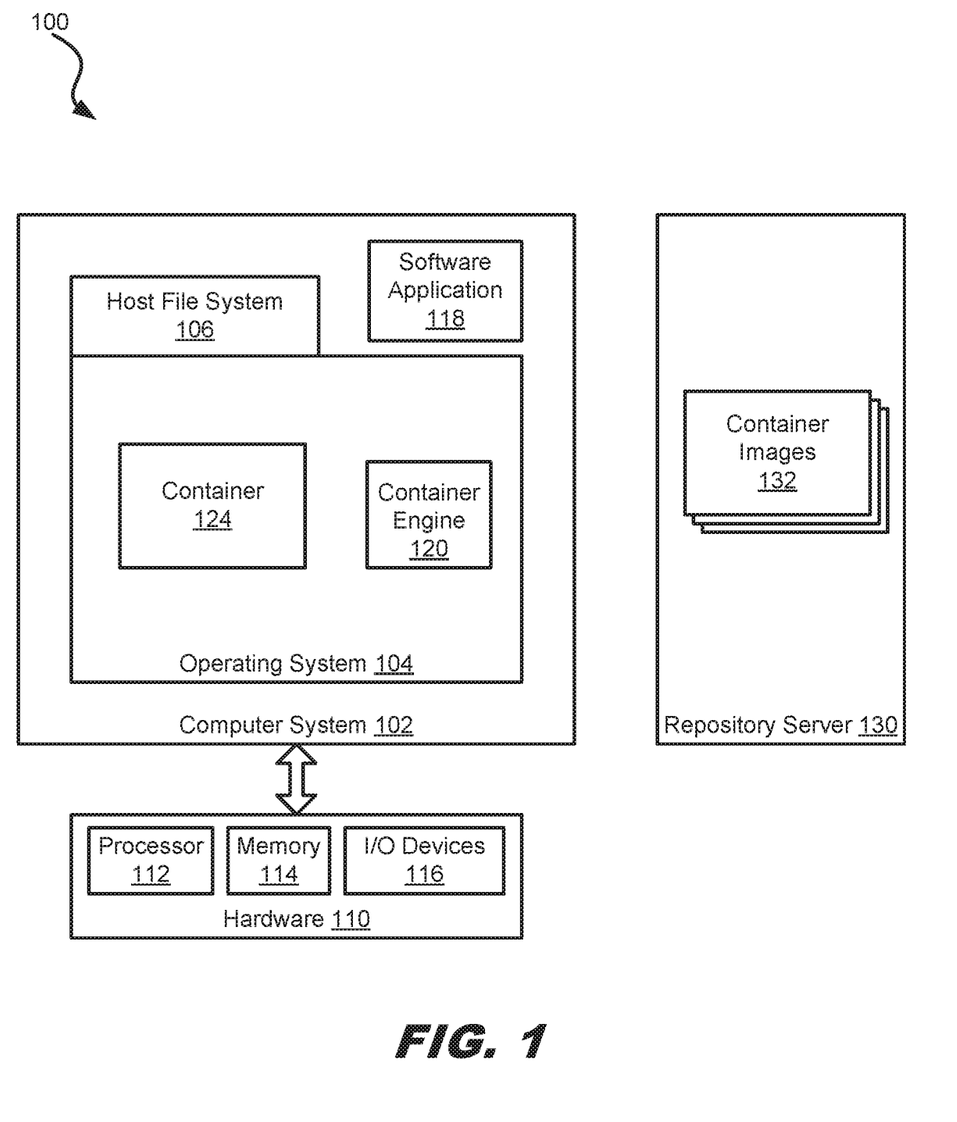
FIG. 1 is a diagram showing an illustrative computing system running a container from a repository, according to one example of principles described herein.

FIG. 1 is a diagram illustrating an example system 100 that may be used to run containers from an optimized set of image layers. System 100 includes a computer system 102 that may be coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 is coupled to hardware 110 such as a processor 112 for executing software (e.g., machine-readable instructions) and using or updating data stored in memory 114. Hardware 110 may include one or more processors 112. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of software and data. The software may include an operating system 104 and various other software applications 118. Hardware 110 may include other I/O devices 116.

Computer system 102 includes an operating system 104 that serves as a central component for facilitating communication between software applications 118 and hardware devices (e.g., processor 112, memory 114, and I/O devices 116) of a machine. Operating system 104 may be responsible for facilitating operating system functions and various management tasks (e.g., process management, disk management, and memory management). For example, operating system 104 manages, organizes, and keeps track of files stored on computer system 102. In an example, operating system 104 keeps track of where files are stored on the system, determines how the files are stored, links files to their owners, distinguishes between different file types (e.g., text files, binary files, and directory files), etc. In the example illustrated in FIG. 1, operating system 104 may manage files using a host file system 106. Host file system 106 may store one or more files, which may be structured as a collection of records or a sequence of bytes.

In an example, host file system 106 is a hierarchical file system. Operating system 104 may organize files into a hierarchical or more complex structure to reflect the relationships among the files, thus providing a comprehensive and easy-to-understand view of the files to the user. For example, a directory is a special type of file that has lists of files and their attributes. In an example, a first directory may store one or more files, where one of these files may be a second directory. Likewise, the second directory may store one or more files, which may or may not include a third directory. The first directory may be referred to as being at a "higher level" than the second directory. Conversely, the second directory may be referred to as being at a "lower level" or "deeper level" than the first directory.

Operating system 104 may use a container engine 120 to load a container 124, which shares the same kernel of the host. Container 124 may include an entire runtime environment: an application, plus all its dependencies, libraries and other binaries, and configuration files needed to run it, bundled into one package. A container may run one or more applications on the local host (e.g., computer system 102), on physical or virtual machines in a data center, or in the cloud. A container may provide additional protection to limit what actions may be performed from within the container.

In the example illustrated in FIG. 1, container 124 is derived from a container image 132 stored in a repository server 130. Container 124 may be self-contained and independent from the host. Additionally, container 124 may have "hooks" into the host. Container 124 may be, for example, a DOCKER® or an Open Container Initiative (OCI™) container. The container image 132 from which the container 124 is derived may include a set of files and provide an indication of a hierarchical structure for the set of files. In an example, container image 132 includes a tar or zip file. When container 124 is launched, container 124 may run a single process. The single process may run an application. In an example, set of files includes one or more configuration files. A configuration file may be used to configure the application (e.g., software application 118). Although computer system 102 is illustrated as including one container, it should be understood that computer system 102 may include more than one container.

Operating system 104 also includes a container engine 120. The container engine 120 takes a container image and turns it into a running container. One example of a container engine is Docker.

Figure 2:
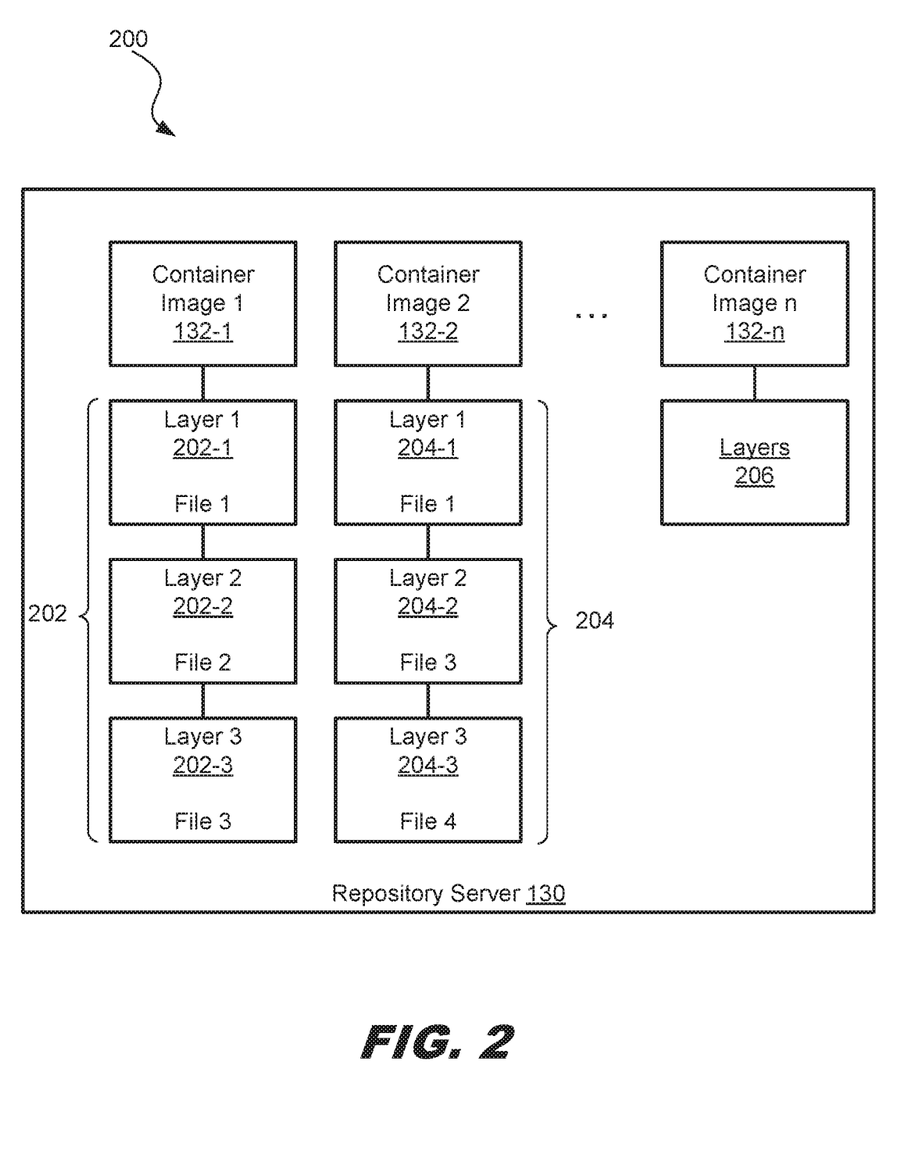
FIG. 2 is a diagram showing an illustrative repository with multi-layered container images, according to one example of principles described herein.

FIG. 2 is a diagram showing an illustrative repository server 130 with multi-layered container images before the optimization process is applied. The repository server 130 may be, for example, one or more servers in a datacenter. In some examples, the repository server 130 may be an integral part of the computing system 130 that runs the container from the container image.

Before the optimization process is applied, Container Image 1 132-1 includes three layers; Layer 1 202-1, Layer 2 202-2 and Layer 3 202-3. Layer 1 202-1 includes File 1, Layer 2 202-2 includes File 2, and Layer 3 202-3 includes File 3. Similarly, Container Image 2 132-2 includes three layers; Layer 1 204-1, Layer 2 204-2, and Layer 3 204-3. Layer 1 204-1 includes File 1, Layer 2 204-2 includes File 3 and Layer 3 204-3 includes File 4. Thus, in the present example, files 1 and 3 are common to both image container images. File 2 is unique to Container Image 1 132-1 and File 4 is unique to Container Image 2 132-2. The repository server 130 may include other container images 132-n, each with their own sets of layers 206.

While the present example describes only two containers, each with only three layers, practical implementations may have hundreds or thousands of container images within a repository server 130. In such cases, there may be hundreds or thousands of similar files within the various layers of the many container images. To improve the use and efficiency of resources, methods described herein provide for analyzing the container images stored in the repository server 130 and creating a new set of layers from which multiple container images may be derived. Specifically, a particular container image may be derived from a subset of the new set of layers.

Figure 3:
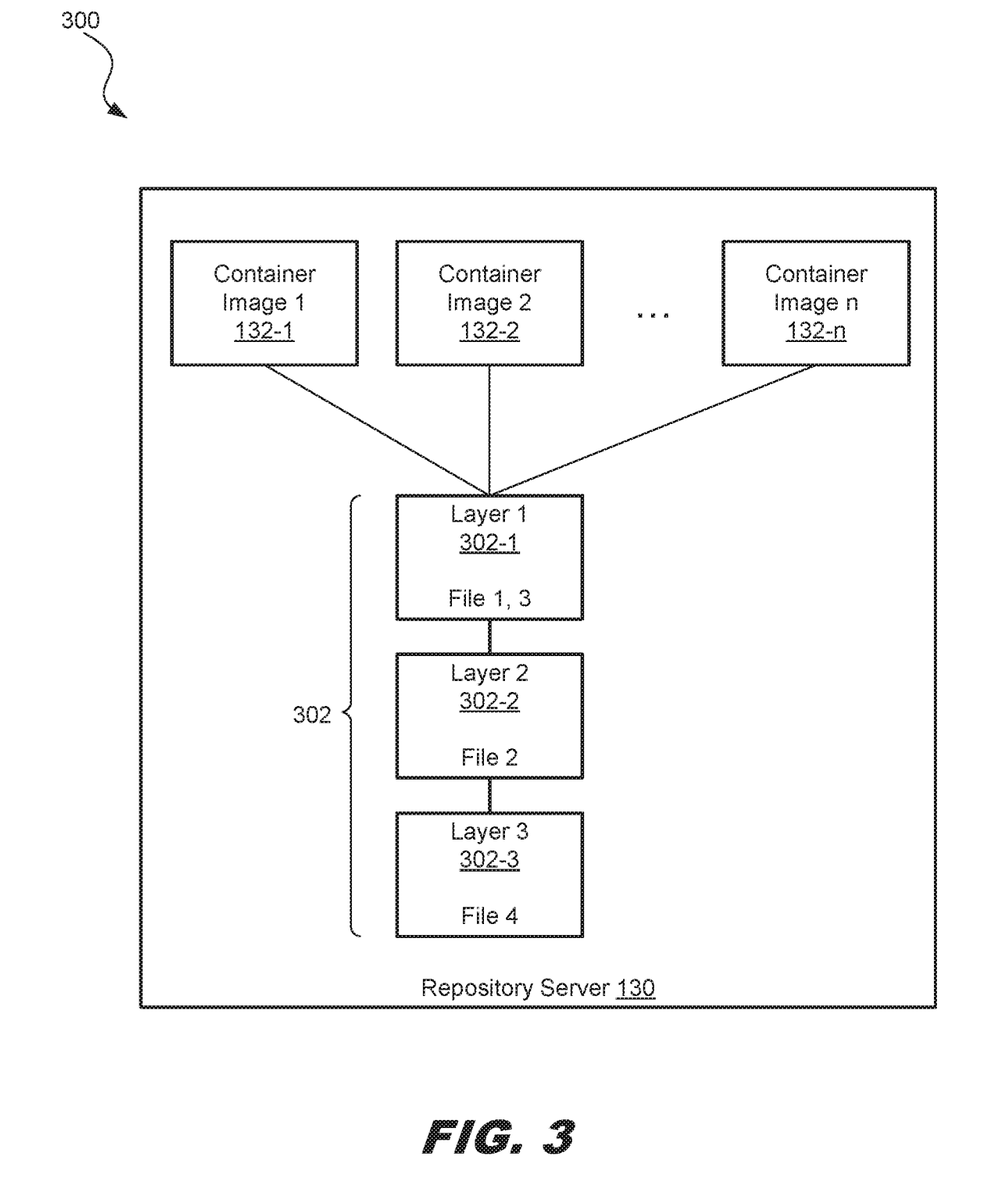
FIG. 3 is a diagram showing an illustrative repository with optimized multi-layered container images, according to one example of principles described herein.

FIG. 3 is a diagram showing an illustrative repository with optimized multi-layered container images. After the analysis has been performed, a new set of layers 302 is formed. This new set of layers may replace the old sets of layers for each of the container images 132-1, 132-2, 132-*n*. In the present example, the new set of layers 302 includes Layer 1 302-1, layer 2 302-2, and layer 3 302-3. Layer 1 302-1 includes both Files 1 and 3. Layer 2 302-2 includes File 2 and layer 3 302-3 includes File 4. Thus, when a container engine (e.g., 120) builds Container Image 1 132-1, it uses a subset of the new set of layers 302. Specifically, it uses Layer 1 302-1 and Layer 2 302-3. Similar, to build Container Image 2 132-2, the container engine uses a subset of layers: Layer 1 302-1 and Layer 3 302-3.

Figure 4:
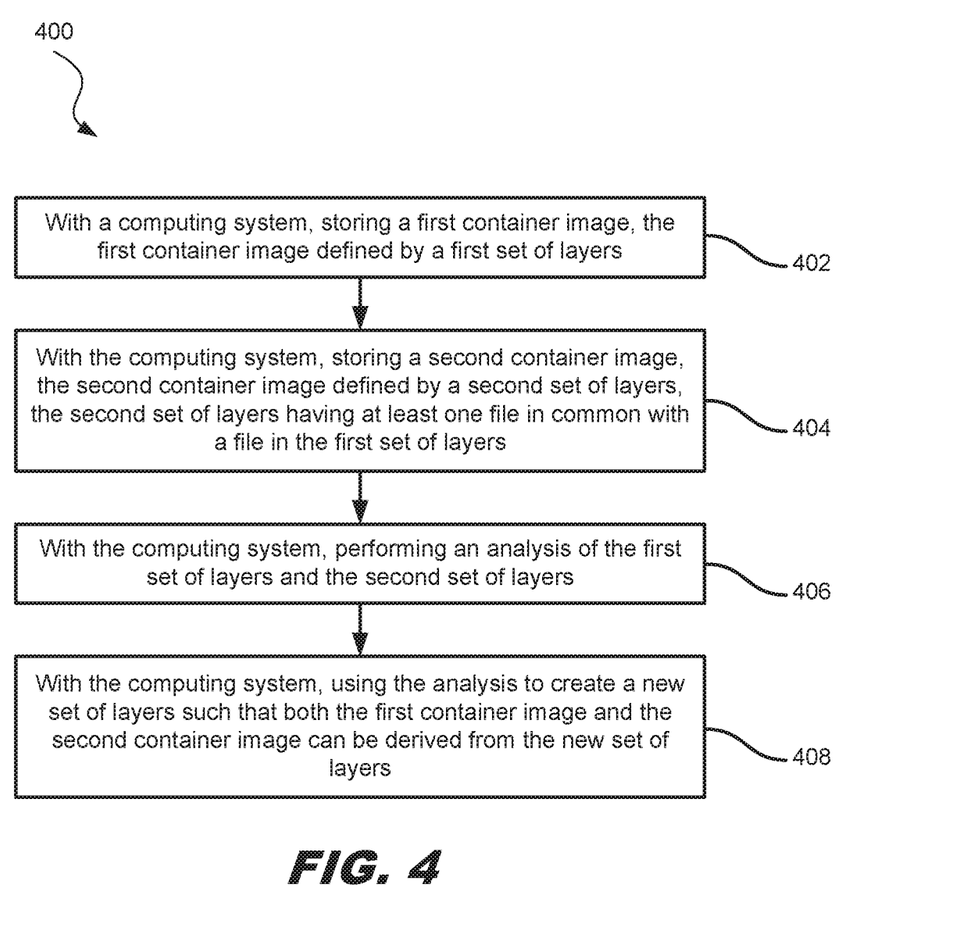
FIG. 4 is a flowchart showing an illustrative method for optimizing multi-layered images, according to one example of principles described herein.

FIG. 4 is a flowchart showing an illustrative method 400 for optimizing multi-layered images. According to the present example, the method 400 includes a process 402 for storing a first container image (e.g., 132-1). The first container image may be defined by a first set of layers (e.g., 202). The method 400 may be performed by a computing system. In one example, the method may be performed by a repository server (e.g., 130). The computing system may be a single machine or may be multiple machines working in concert. In one example, the computing system may be a processing server that is in communication with the repository server 130.

The method 400 further includes a process 404 for storing a second container image (e.g., 132-2). The second container image may be defined by a second set of layers (e.g., 204). The second set of layers may have at least one file in common with a file in the first set of layers. For example, the first set of layers may include File 1. Additionally, the second set of layers may include File 1.

The method 400 further includes a process 406 for performing an analysis of the first set of layers and the second set of layers. This analysis may be to determine which layers have files in common with other layers. The analysis may be a function or process that is run on a computing system such as the repository server, or a computing system in communication with the repository server.

Various techniques may be used to determine if two different files are identical. For example, a hash function may be used to determine if two files are identical. Specifically, a hash function may be applied to one file to obtain a first hash result and the hash function may be applied to another file to obtain a second hash result. If the first hash result matches the second hash result, then it may be determined that the two files are identical. Another technique for determining whether two files are identical may be to look at the characteristics of the files to determine similarity. For example, two files may have both the same name or identified, have the same file size, and may have both been created at the same date and time. In such cases, it may be determined that the two files are identical. Other mechanisms for determining which files are identical may be used.

In some examples, the analysis performed by the function or process may proceed through each container image within the repository. In some examples, the analysis may be performed on a subset of the container images in the repository. That subset, in some examples, may be defined by a user. In some examples, however, the subset of container images on which the analysis is applied may be selected by a function of the computing system.

The method 400 further includes a process 408 for using the analysis to create a new set of layers (e.g., 302) such that both the first container image and the second container image can be derived from the new set of layers. In other words, to build the first container image, a container engine can use a subset of the new set of layers. Similarly, to build the second container image, a container engine can use a subset of the same new set of layers. By performing the analysis of process 406 and creating the new set of layers, the amount of redundantly stored data may be reduced, thus freeing up more storage resources. This allows the repository to operate more efficiently with improved performance.

Figure 5:
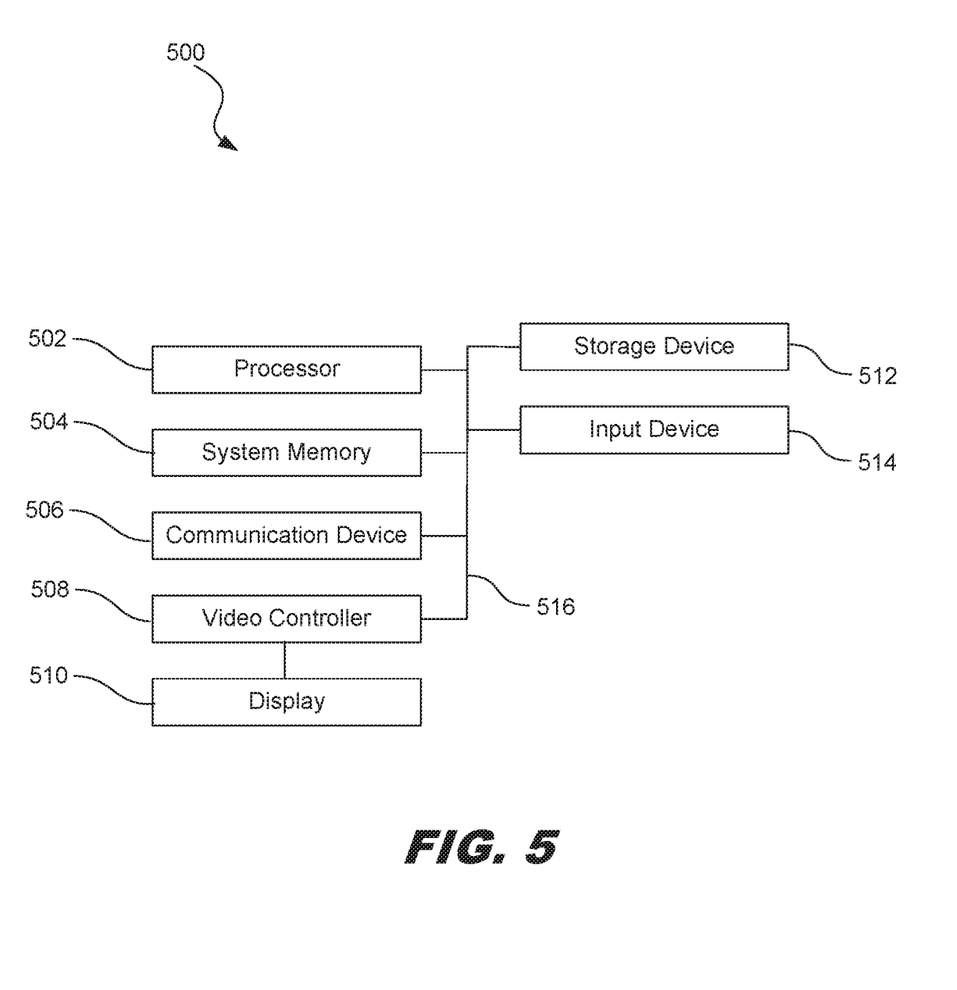
FIG. 5 is a diagram showing an illustrative computing system for performing functions described herein for optimizing multi-layered images, according to one example of principles described herein.

FIG. 5 is a diagram showing an illustrative computing system for performing functions described herein for optimizing multi-layered images. In one example, the computing system 500 may be the computing system on which a container is run. In one example, the computing system 500 may be a that stores container images (i.e., a container image repository server).

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, tablets, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods (e.g., 400). In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
    with the computing system, storing a first container image in a repository server, the first container image defined by a first set of layers, the first set of layers including a first set of files;
    with the computing system, storing a second container image in the repository server, the second container image defined by a second set of layers, the second set of layers including a second set of files, the first set of files and the second set of files having at least one file in common;
    with the computing system, performing an analysis of the first set of layers and the second set of layers, the analysis comparing characteristics of files in the first set of layers and files in the second set of layers, wherein the characteristics comprise a name of the file, a file size, a creation date, and a creation time;
    with the computing system, and based on the analysis comparing characteristics, identifying one or more files in the first set of layers that are identical to one or more files in the second set of layers;
    with the computing system, creating a new set of layers in the repository server such that both the first container image and the second container image can be derived from the new set of layers, the new set of layers comprising at least one new layer that includes at least one of the one or more identical files from layers of both the first container image and the second container image and wherein the creation of the new set of layers includes switching at least one file of the first set of files or the second set of files located in a first layer within the first set of layers or the second set of layers to a second layer within the new set of layers, the second layer being different from the first layer;
    with the computing system, providing a first copy of the first container image in the repository server using a first subset of the new set of layers, the first copy including an indication of a hierarchal structure of the files of the new set of layers; and
    with the computing system, providing a second copy of the second container image in the repository server using a second subset of the new layers, the second subset being different than the first subset, and the second copy including the indication of a hierarchal structure of the files of the new set of layers.

2. The method of claim 1, wherein the new set of layers includes a layer having a file from a layer of the first set of layers and a file from the second set of layers.

3. The method of claim 1, further comprising, receiving a request from a client device for the first container image.

4. The method of claim 3, further comprising, using the new set of layers to provide the first container image in response to the request.

5. The method of claim 1, further comprising, receiving a request from a client device for the second container image.

6. The method of claim 5, further comprising, using the new set of layers to provide the second container image in response to the request.

7. The method of claim 1, wherein the computing system comprises a database for storing container image layers.

8. The method of claim 1, wherein the first container image is an Open Containers Initiative OCI image.

9. A method performed by a computing system, the method comprising:
storing a plurality of container images in a repository server, each container image derived from a unique set of layers;
analyzing the sets of layers for each of the plurality of container images, the analyzing comparing characteristics of a first set of files in a first set of layers and a second set of files in a second set of layers, wherein the characteristics comprise a name of the file, a file size, a creation date, and a creation time;
identifying, based on the comparing characteristics, one or more files in the first set of files that are identical to one or more files in the second set of files;
creating a new set of layers in the repository server from which each of the plurality of container images can be built, the new set of layers comprising at least one new layer that includes at least one of the one or more identical files from layers of at least two or more of the plurality of container images, and wherein the creation of the new set of layers includes switching at least one file of the first set of files or the second set of files located in a first layer within the first set of layers or the second set of layers to a second layer within the new set of layers, the second layer being different from the first layer;
providing a first copy of a first container image of the plurality of container images in the repository server using a first subset of the new set of layers, the first copy including an indication of a hierarchal structure of the files of the new set of layers; and
providing a second copy of a second container image of the plurality of container images in the repository server using a second subset of the new layers, the second subset being different than the first subset, and the second copy including the indication of a hierarchal structure of the files of the new set of layers.

10. The method of claim 9, further comprising, receiving from a client, a request for a first one of the plurality of container images.

11. The method of claim 10, further comprising, providing the client with the first one of the plurality of container images by utilizing the new set of layers in response to the request.

12. The method of claim 9, wherein the new set of layers includes one layer having at least two files that are identical to each of the sets of layers for at least two or more of the plurality of container images.

13. The method of claim 9, wherein the plurality of container images are Open Containers Initiative (OCI) images.

14. A system comprising:
a processor; and
a memory comprising machine readable instructions that when executed by the processor, cause the system to:
store a first container image in a repository server, the first container image defined by a first set of layers, the first set of layers including a first set of files;
store a second container image in the repository server, the second container image defined by a second set of layers, the second set of layers including a second set of files, the second set of layers having at least one layer in common with the first set of layers, and the first set of files and the second set of files having at least one file in common;
perform an analysis of the first set of layers and the second set of layers, the analysis comparing characteristics of files in the first set of layers and files in the second set of layers, wherein the characteristics comprise a name of the file, a file size, a creation date, and a creation time;
identify, based on the analysis comparing characteristics, one or more files in the first set of layers that are identical to one or more files in the second set of layers;
use the analysis to create a new set of layers in the repository server such that both the first container image and the second container image can be derived from the new set of layers, the new set of layers comprising at least one new layer that includes at least one of the one or more identical files from layers of both the first container image and the second container image and wherein the creation of the new set of layers includes switching at least one file of the first set of files or the second set of files located in a first layer within the first set of layers or the second set of layers to a second layer within the new set of layers, the second layer being different from the first layer;
provide a first copy of the first container image in the repository server using a first subset of the new set of layers, the first copy including an indication of a hierarchal structure of the files of the new set of layers; and
provide a second copy of the second container image in the repository server using a second subset of the new layers, the second subset being different than the first subset, and the second copy including the indication of a hierarchal structure of the files of the new set of layers.

15. The system of claim 14, wherein the new set of layers includes a layer having a file from a layer of the first set of layers and a file from the second set of layers.

16. The system of claim 14, wherein the system is further to receive a request from a client device for the first container image.

17. The system of claim 16, wherein the system is further to use the new set of layers to provide the first container image in response to the request.

18. The system of claim 14, wherein the system is further to receive a request from a client device for the second container image.

19. The system of claim 18, wherein the system is further to use the new set of layers to provide the second container image in response to the request.

20. The system of claim 14, wherein the first container image is an Open Containers Initiative OCI image.

* * * * *